United States Patent
D'angelo et al.

(10) Patent No.: US 11,918,906 B2
(45) Date of Patent: *Mar. 5, 2024

(54) SYSTEMS AND METHODS FOR PROVIDING VIDEO GAME GAMEPLAY HAVING FALLING PUZZLE MECHANICS INFLUENCED BY CHARACTER MOVEMENTS WITHIN A PUZZLE SPACE

(71) Applicant: YACHT CLUB GAMES, LLC, Los Angeles, CA (US)

(72) Inventors: David D'angelo, Los Angeles, CA (US); Alec Faulkner, Los Angeles, CA (US); Nickolas Wozniak, Los Angeles, CA (US); Sean Velasco, Los Angeles, CA (US); Ian Flood, Los Angeles, CA (US); Morgan Guyer, Los Angeles, CA (US); Michael Herbster, Los Angeles, CA (US); Russell Rafferty, Los Angeles, CA (US)

(73) Assignee: YACHT CLUB GAMES, LLC, Los Angeles, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 17/459,831

(22) Filed: Aug. 27, 2021

(65) Prior Publication Data

US 2021/0394066 A1 Dec. 23, 2021

Related U.S. Application Data

(63) Continuation of application No. 16/536,311, filed on Aug. 8, 2019, now Pat. No. 11,141,661.

(Continued)

(51) Int. Cl.
A63F 13/20 (2014.01)
A63F 13/52 (2014.01)
(Continued)

(52) U.S. Cl.
CPC ............ *A63F 13/56* (2014.09); *A63F 13/822* (2014.09); *A63F 2300/64* (2013.01); *A63F 2300/807* (2013.01)

(58) Field of Classification Search
None
See application file for complete search history.

(56) References Cited

U.S. PATENT DOCUMENTS 8,882,582 B2 11/2014 Avent et al.
8,944,914 B2 2/2015 Hsu
(Continued)

*Primary Examiner* — Lawrence S Galka
(74) *Attorney, Agent, or Firm* — DLA PIPER LLP (US)

(57) ABSTRACT

Embodiments are directed towards providing video game gameplay incorporating falling puzzle mechanics influenced by character movements within a puzzle space. In a preferred embodiment, a computer implemented method renders a game world that includes a puzzle space wherein a sequence of falling items aggregate in a puzzle formation. Players move characters within the puzzle space to remove items by colliding with them in an attempt to resolve the puzzle by clearing all items from the puzzle space. In one possible arrangement, the sequence of falling items is released according to character movements within the puzzle space. The relationship between character movements and falling puzzle items makes the game play more engaging by providing additional strategic and competitive elements to traditional falling puzzle games.

21 Claims, 8 Drawing Sheets

Related U.S. Application Data

(60) Provisional application No. 62/716,357, filed on Aug. 8, 2018.

(51) Int. Cl.
  *A63F 13/56* (2014.01)
  *A63F 13/822* (2014.01)
  *G06F 17/00* (2019.01)

(56) References Cited

U.S. PATENT DOCUMENTS

| | | |
|---|---|---|
| 10,569,176 B2 | 2/2020 | D'angelo et al. |
| 2011/0218041 A1* | 9/2011 | Itami .................... A63F 13/812 463/31 |
| 2014/0370950 A1* | 12/2014 | Hansson ................ A63F 13/00 463/9 |
| 2017/0294081 A1 | 10/2017 | Washington et al. |
| 2018/0001216 A1 | 1/2018 | Bruzzo et al. |

\* cited by examiner

SYSTEMS AND METHODS FOR PROVIDING VIDEO GAME GAMEPLAY HAVING FALLING PUZZLE MECHANICS INFLUENCED BY CHARACTER MOVEMENTS WITHIN A PUZZLE SPACE

CROSS REFERENCE TO RELATED APPLICATIONS

This application is a continuation of and claims priority pursuant to 35 U.S.C. § 119(e) to U.S. application Ser. No. 16/536,311 filed Aug. 8, 2019 which claims priority pursuant to 35 U.S.C. § 119(e) to U.S. Provisional Application Ser. No. 62/716,357 filed Aug. 8, 2018, the content of which are incorporated by reference as though fully set forth.

FIELD

The present disclosure generally relates to video games, and more particularly to video game gameplay aspects that combine falling puzzle mechanics with turn-based gird movement strategy games.

BACKGROUND

A turn based interactive video gameplay may be desirable for providing a more entertaining video game playing experience and simplifying programming of game AI.

DESCRIPTION

The present invention relates to systems, devices, and methods for creating an interactive game world having unique video game gameplay. The gameplay provided by the invention described herein combines falling puzzle mechanics with turn-based grid movements and battle sequences to increase engagement with video game content displayed in an interactive game world. Game reacts to user input to create a more interactive experience also creates a more streamlined design for a game AI because the events in the game are dependent on—a driven by—the user. Controls received from the user are used to dictate the conditions in the game.

Figure 1:
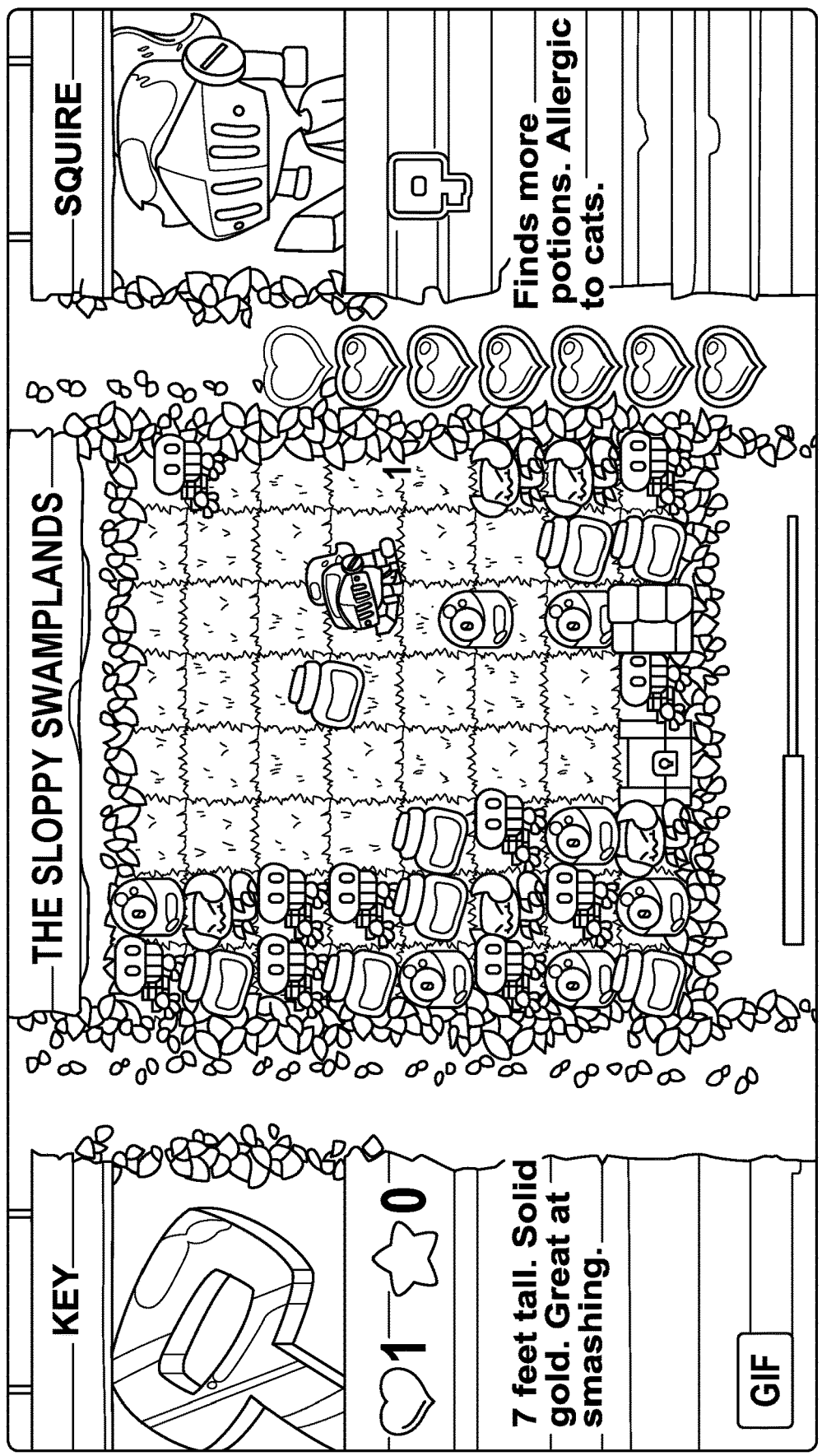
FIG. 1 illustrates an exemplary game world including gameplay that comprises falling puzzle mechanics with turn-based grind movements.

FIG. 1 illustrates an exemplary game world for implementing the gameplay design. The UI includes a three panel game world with a puzzle space in the middle surrounded on both sides by side panels. The puzzle space includes a character and a plurality of different puzzle items. One possible example includes one character and five different types of puzzle objects. Other examples include multiple characters and greater or fewer types of puzzle objects. Each type of puzzle object may have unique attributes that cause it to perform a particular function in the game, for example, provide more health or unlock a game advantage.

The object of the game is to resolve the puzzle in the puzzle space by removing all the puzzle items. Characters remove puzzle items by colliding with the items or performing another attack action. In one possible example, characters can only attack items that are immediately adjacent to the character's position in the puzzle space, i.e. items that are in one of the four (right, left, above, and below) squares surrounding the character. In other examples, characters may attack items that are diagonal to the character's current position or are located more than one space away from the character's position. Character collisions with puzzle items may be limited. In one example, each time a character collides with a puzzle item, the character loses some life. To gain more life, the character has to collide with a life replenishing puzzle item, for example, a portion. The constraints on character life causes interactions with puzzle items of different types to be carefully planned by players because if a character collides with a puzzle item when it has a minimum amount of life the character will die and the player will lose the run.

Different puzzle items have unique requirement for removal, for example, the character may have to perform a set number of collisions with the item before the item disappears. Certain items may also only take damage at certain times, for example, some items do not take continuous damage and require at least one character movement between collisions with the item. Puzzle items may also give advantages to characters in the game. In one possible example some puzzle items explode, freeze, catch fire, color, poison, vaporize, or otherwise affect puzzle items in their immediate or proximate vicinity. Interacting with one of these puzzle items may clear a portion or all puzzle items in the puzzle space rapidly to give the player and advantage in the game. Other types of puzzle items may unlock special rewards or talents in the game, for example, immunity from damage, longer life, replenished life, enhanced damage to puzzle items, or passage to the next phase or level of the game. In one possible world embodiment all puzzle items are static and all fit into the same square shape. Other embodiments provide for moving puzzle items, characters that can move and otherwise arrange puzzle items in the puzzle space and different shaped puzzle items to create different puzzle space fill shapes and different arrangements of groups of puzzle items and spaces in between the arranged items.

As a general rule of the gameplay described herein, puzzle items are released according to the movement of the character so that every time the character moves a new puzzle item is released simultaneously. Characters moving rapidly within the game space will cause more puzzle items to be released. In turn, characters moving methodically through the puzzle space will cause items to be released less frequently. In addition to being dependent on the character movements, the algorithmic release of puzzle items provided by the systems and methods of the invention also include a time trigger. The time trigger will cause puzzle items to be released at time dependent intervals if the character is not moving in the puzzle space. The time intervals for releasing puzzle items when the character is not moving may be a variable so that the interval is shorter and puzzle items are release more rapidly absent character movement for phases that come later in the game or more advanced levels of difficulty.

The simultaneous action/reaction cycle where each character movement causes release of a new puzzle item is an important aspect of the gameplay described herein and creates a feeling of competing against the puzzle. This dynamic also rewards strategic players who can clear the puzzle space in a few moves. The ability to clear multiple puzzle items of the same type that are adjacent, connected, one the same line, or share some other discernable connection to an item a character attacks is an important aspect of puzzle solving strategy that can provide players an advantage in the gameplay described herein. To test puzzle resolving skill and strategy, one possible embodiment of the gameplay design described herein includes a puzzle mode that requires clearing all or a portion of the items from a puzzle space in a certain number of moves or within a defined time period. Other gameplay modes may include a co-op mode where two characters collaborate to clear a puzzle space by each individually colliding with puzzle item to remove them. A head to head mode may also be incorporated. In this mode two puzzle spaces would be displayed on screen with one puzzle space for each player. Competing players would then battle to see who can clear the puzzle space the fastest with each player able to see the process of the other player on screen.

In one possible embodiment, the gameplay is organized into stages with each stage having different stage characteristics, for example, puzzle items, character attributes, stage or items names, and requirements for advancing through the stage. After completion of a stage some storyline text and/or graphics may be displayed to make the journey through the stages seem more meaningful and cohesive. In one possible embodiment includes a character equipment phase that allows players to select an attribute, talent, or item to give to their character to help them complete the next stage. Players may be able to save process through the stages or they may be forced to return to the first stage at the end of a run. As part of the character equipment phase, players may be able to buy items with coins obtained during previous stages or purchased from an online store.

Other game world enhancements that may be incorporated into the gameplay design described herein includes the ability of puzzle items to do damage to other puzzle items. In one possible embodiment, taking out a line of puzzle items will cause items above the destroyed line to do damage to items below the line. Additional puzzle game features may also be incorporated included combo notifications, higher scores or multipliers for combos or destruction of a group of puzzle items. Notifications may be pushed on screen to indicate that players have performed a combo or unlocked an items or ability in the game. The side panels may also be sync with activities occurring the main puzzle space, for example, flashing when a character is taking damage, or shaking when a character is doing damage to puzzle items or performs a combo. Activity in the side panel may sync to a haptic system in a game device to vibrate the device when an activity occurs.

In addition to different types of puzzle items, there may also be different types of weapons or abilities that may be unlocked or discovered in the game. These items may allow characters to attack items that are not immediately adjacent, pause the release of puzzle items, make getting combos easier, alter the puzzle item distribution algorithm to make only large groups of the same types of items, causing moving enemies or objects to remain still, or otherwise give a character an advantage in the game.

Figure 2:
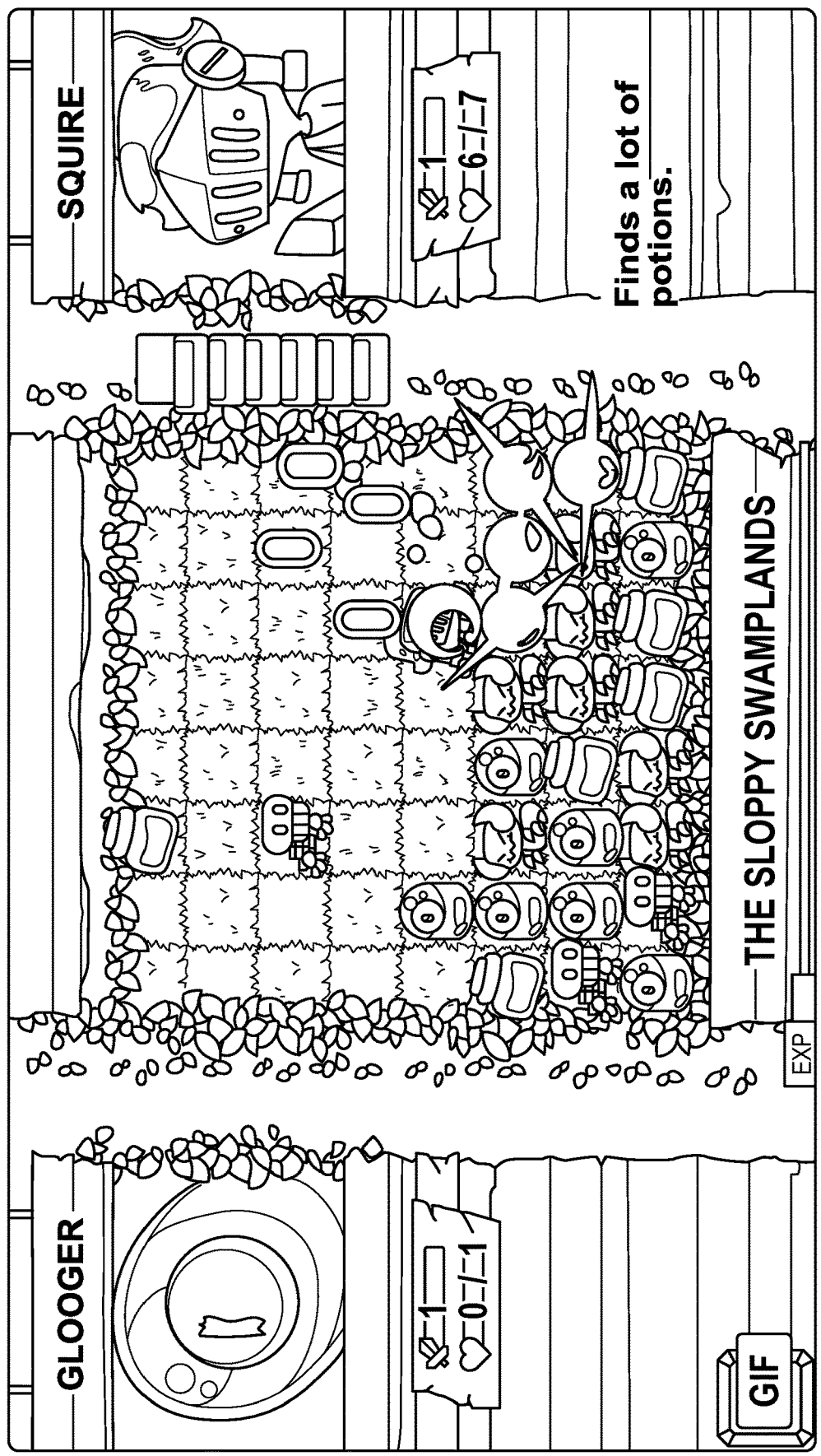
FIG. 2 illustrates an exemplary game world including the gameplay of FIG. 1, wherein the puzzle item removal animation is shown in the puzzle space.

FIG. 2 illustrates one possible puzzle item clearing animation that may be used in the game word. In this embodiment clearing puzzle items form the puzzle space results in the creation of many coins that flow into the character. Other animations for removing items may be included in other embodiments. Additionally, many other possible variations in other gameplay elements are within the scope of the invention described herein. Possible gameplay elements that may be varied include: visual effects, for example, explosions, fire, and coins; puzzle items, for example, bombs, elemental bombs, and monsters; character talents and abilities; character animations including attacks other than bumping or colliding with puzzle items; UI synergies between the main puzzle panel and the side panels, for example, flashing when taking damage, shaking when colliding with an object; and UI elements generated according to interactions between characters and puzzle items, for example, targeting elements and hit counters.

Figure 3:
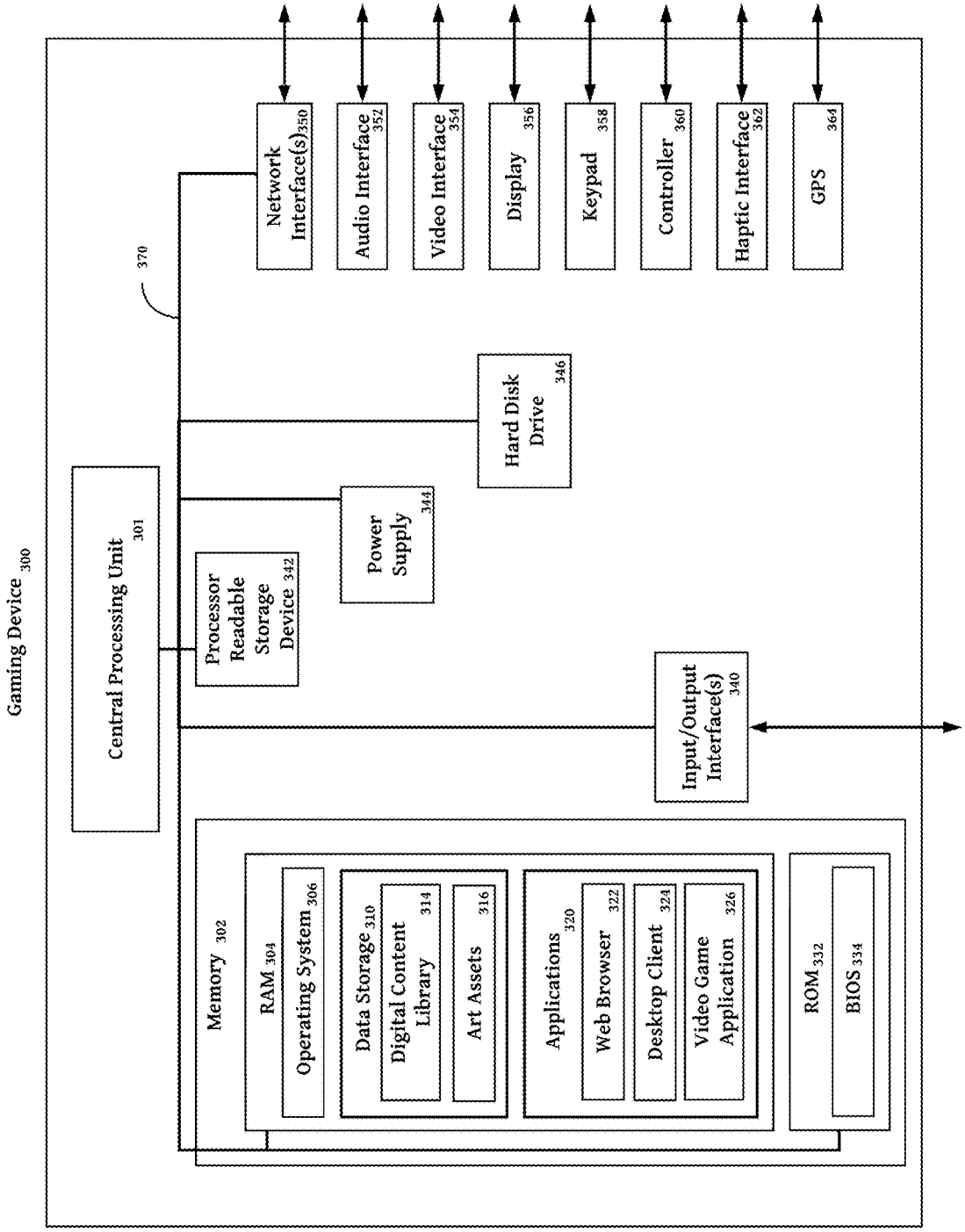
FIG. 3 displays an exemplary gaming device for providing the game world implementation of FIGS. 1-2.

FIG. 3 illustrates one possible gaming device 300 for implementing embodiments of the gameplay design disclosed herein. Components included in the gaming device may communicate directly, for example, through a message BUS, wired network connection, or any other suitable direct connection, or remotely with a content provider or other third party system or application through one or more wired or wireless networks, for example, an ad hoc network, an intranet, and extranet, a virtual private network (VPN), a local area network (LAN), a wireless LAN (WLAN), a wide area network (WAN), a wireless WAN (WWAN), a metropolitan area network (MAN), a portion of the Internet, a cellular telephone network, another type of network, or a combination of two or more such networks. The gaming device may be a computing device, for example, a personal computer, desktop computer, laptop, mobile phone, smartphone, tablet, handheld computer, or gaming consoles, for example, XBOX ONE, PLAYSTATION 4, NINTENDO WII, NINTENDO SWITCH, any previous version of one of these systems, or any other suitable game console.

In various embodiments, the gaming device 300 may include many more or less components than those shown in FIG. 3. However, the components shown are sufficient to disclose an illustrative embodiment for practicing the present invention. As shown in the FIG. 3, the gaming device 300 can include a central processing unit ("CPU") 301 and/or a graphics processor ("GPU") in communication with a mass memory 302 via a bus 370. The gaming device 300 may include a power supply 334, one or more network interfaces 350, an audio interface 352, a display 356, a keypad 358, a video interface 354, an input/output interface 340, a haptic interface 362, and a global positioning systems ("GPS") receiver 364.

Power supply 334 may provide power to gaming device 300. A rechargeable or non-rechargeable battery may be used to provide power. The power may also be provided by an external power source, such as an alternating current ("AC") adapter or a powered docking cradle that supplements and/or recharges a battery.

The gaming device 300 may optionally communicate with a base station or directly with another computing device. Network interface 350 can include circuitry for coupling a gaming device 300 to one or more networks, and is constructed for use with one or more communication protocols and technologies including, but not limited to, GSM, code division multiple access ("CDMA"), time division multiple access ("TDMA"), user datagram protocol ("UDP"), transmission control protocol/Internet protocol ("TCP/IP"), Short Message Service ("SMS"), GPRS, WAP, ultra wide band ("UWB"), Institute of Electrical and Electronics Engineers ("IEEE") 802.16 Worldwide Interoperability for Microwave Access ("WiMax"), session initiated protocol/real-time transport protocol ("SIP/RTP"), or any of a variety of other wired and/or wireless communication protocols. Network interface 350 is sometimes known as a transceiver, transceiving device, or network interface card ("NIC").

The audio interface 354 may be arranged to produce and receive audio signals such as the sound of a human voice. For example, audio interface 354 may be coupled to a speaker and microphone to enable telecommunication with others and/or generate an audio acknowledgement for some action. A display 356 may be an LCD, gas plasma, light emitting diode ("LED"), or any other type of display used with a computing device. The display 356 may include a touch sensitive screen arranged to receive input from an object such as a stylus or a digit from a human hand. A user interface generated by one or more processors (e.g., a central processing unit 301, a graphics processor 380, and the like) executing instructions provided by the video game application 326 may be displayed on the display 356. A keypad 358 may comprise any input device arranged to receive input from a user. For example, the keypad 358 may include a push button numeric dial, or a keyboard. The keypad 358 may also include command buttons that are associated with selecting and sending images. Input received by the keypad 358 may be used to manipulate the user interface displayed on the display 356.

The video interface 354 may include a camera or other imaging device for capturing video images, such as a still photo, a video segment, an infrared video, or the like. For example, a video interface 354 may be coupled to a digital video camera, a web-camera, or the like. The video interface 354 may comprise a lens, an image sensor, and other electronics. Image sensors may include a complementary metal-oxide-semiconductor ("CMOS") integrated circuit, charge-coupled device ("CCD"), or any other integrated circuit for sensing light.

In various embodiments, the gaming device 300 also comprises input/output interface 340 for communicating with external devices, such as a headset, or other input or output devices not shown in FIG. 3. The input/output interface 340 can utilize one or more communication technologies, such as USB, infrared, Bluetooth™, or the like to receive and communicate input from a user or other source external to the gaming device 300 to an interactive game world included in a user interface displayed on the display 356. A haptic interface 362 may provide tactile feedback to a user of the gaming device 300 to communicate certain events that occur in the interactive game world. For example, the haptic interface 362 may be employed to vibrate gaming device 300 in a particular way when a character included in the interactive game world interacts with an object in the block arrangement.

A GPS transceiver 364 can determine the physical coordinates of gaming device 300 on the surface of the Earth. GPS transceiver 364, in some embodiments, may be optional. GPS transceiver 364 typically outputs a location as latitude and longitude values. However, a GPS transceiver 364 can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of gaming device 300 on the surface of the Earth. It is understood that under different conditions, GPS transceiver 364 can determine a physical location within millimeters for gaming device 300; and in other cases, the determined physical location may be less precise, such as within a meter or significantly greater distances. In one embodiment, however, mobile device 300 may through other components, provide other information that may be employed to determine a physical location of the device, including for example, a Media Access Control ("MAC") address, IP address, or the like.

Mass memory 302 includes a Random Access Memory ("RAM") 304, a Read-only Memory ("ROM") 332, and other storage means. Mass memory 302 illustrates an example of computer readable storage media (devices) for storage of information such as computer readable instructions, data structures, program modules or other data. Mass memory 302 stores a basic input/output system ("BIOS") 334 for controlling low-level operation of gaming device 300. The mass memory may also store an operating system 306 for controlling the operation of the gaming device 300. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 302 may include one or more data storage 310 resources, which can be utilized by the gaming device 300 to store, among other things, applications 320 and/or other data. For example, data storage 310 may store information that describes various capabilities of gaming device 300. The information may then be provided to another device based on any of a variety of events, including being sent as part of a header during a communication, sent upon request, or the like. Data storage 310 may store social networking information including address books, buddy lists, aliases, user profile information, or the like. Further, data storage 310 may also store messages, web page content, or any of a variety of user generated content. At least a portion of the information may also be stored on another component of network device 300, including, but not limited to computer readable storage device 342, a disk drive or other computer-readable storage device within gaming device 300.

In various embodiments, data storage 310 may include a digital content library 314 comprising all of the art assets and raw storyline information used by the video game application to create an interactive game world. In one possible configuration, the digital content library 314 may be encrypted. The digital content library 314 may include a plurality of different content that can accessed according to instructions provided by the video game application 326. For example, images, video, audio files, audio visual files, art assets, landscape features, puzzle space features, icons, objects representations, character art assets, object art assets, enemy art assets, user interface elements, and the like may be stored in the digital content library and provided to a display 356, video interface 354, audio interface 352, haptic interface 362, and the like as a part of an interactive game world created by one or more processors executing instructions included in a video game application 326.

Applications 320 may include computer executable instructions which, when executed by gaming device 300, transmit, receive, and/or otherwise process messages (e.g., SMS, Multimedia Message Service ("MMS"), instant messages ("TM"), email, and/or other messages), audio, video, and enable telecommunication with another user of another client device. Other examples of application programs include calendars, search programs, email clients, IM applications, SMS applications, voice over Internet Protocol ("VoIP") applications, contact managers, task managers, transcoders, database programs, word processing programs, security applications, spreadsheet programs, games, search programs, and so forth. Applications 320 may include, for example, browser 322, desktop client 324, and a video game application 326.

A browser 322 may include virtually any application configured to receive and display graphics, text, multimedia, and the like, employing virtually any web based protocol. In various embodiments, the browser application is enabled to employ HDML, WML, WMLScript, JavaScript, SGML, HTML, XML, and the like, to display and send a message. However, any of a variety of other web-based programming languages may be employed. In various embodiments, browser 322 may enable a user of gaming device 300 to provide and/or receive content from another computing device, such as a video game application or video game application update. Although browser 322 is described herein, it should be noted that there are a plurality of other applications that may operate as a user agent configured to request and/or access content. Thus, other user agents may also be included within the gaming device 300.

The desktop client 324 may include a desktop game client used to install and play video game files. The desktop client 324 may be a web application or desktop application compatible with a laptop or desktop computing device. In various embodiments, the desktop client 324 may include a web or mobile application compatible with a mobile computing device, for example a smart phone or tablet. In various embodiments, the desktop client 324 interfaces with the video game application 326 to cause one or more processors to execute program instructions included in the game application 326 to create an interactive game world. The desktop client may also facilitate downloaded one or more video game applications 326 to the gaming device as well as updates to the one or more video game application 326 installed on the gaming device 300. In various embodiments, the desktop client 324 may connect to the Internet to enable multiple players to play against each other in the video game from remote locations. A more detailed architecture of a video game application 326 for creating an interactive game world is shown below in FIG. 4.

Figure 4:
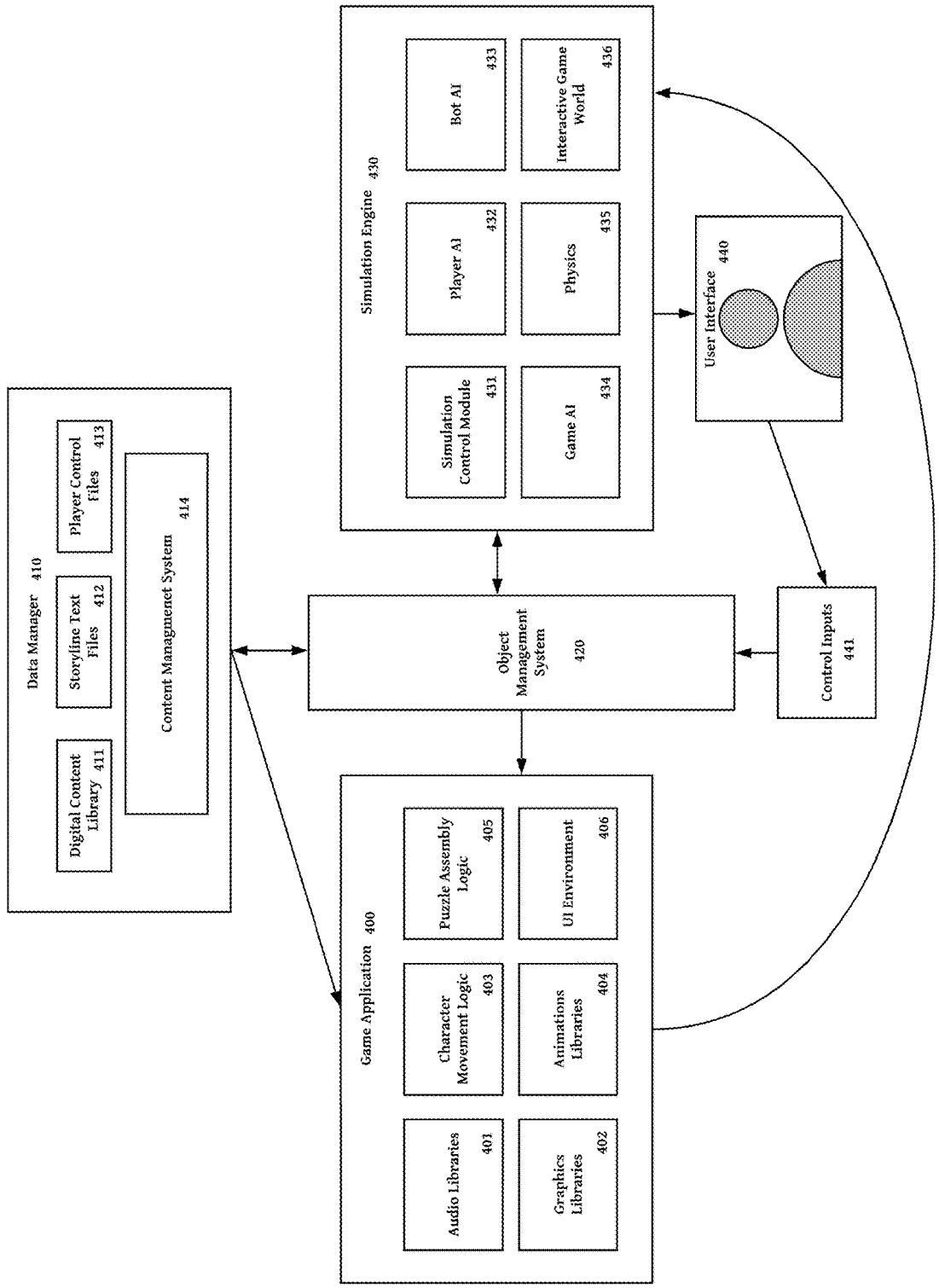
FIG. 4 displays an exemplary application architecture for providing the game world shown in FIGS. 1-2.

FIG. 4 displays an application architecture included in a video game application 326 implementing the video game gameplay described herein. The data manager 410, game constructor 400, simulation engine 430, and user interface (UI) 440 components may communicate with each other directly through a message BUS or other messaging service or remotely through a wireless network connection. The video game application 326 includes a game constructor 400 that creates stages included in the interactive game world by arranging and/or animating raw art assets (e.g., images, video, audio files, and the like) provided by the data manager 410. The simulation engine 430 renders stages created by the game constructor 400 as a simulated instance of an interactive game world displayed in a UI 440. By entering control inputs 441 in a user interface 440 rendering the instance of the interactive game world, players can control a character included in the interactive game world to engage in the video game gameplay described herein. An object management system 420 for updates state information according to control inputs 441 to change the stages constructed by the game constructor 400 and the composition of the constructed stages in response to events that occur in the simulated instance of the interactive game world.

In various embodiments, the game constructor 400 can include one or more libraries containing programming instructions and content for creating an interactive game world. The game constructor 400 can include one or more logical components for assembling, ordering, and/or animating content included in the libraries into a plurality of stages included in an interactive game world. Audio libraries 401 may include audio content (e.g., audio files, sound effects, soundtrack songs, and the like) and audio processing instructions (e.g., digital signal processing instructions, mixing instructions, volume configurations, and the like) for integrating audio content into stages of an interactive game world. Audio libraries 401 may also include one or more audio triggers than condition playing one or more pieces of audio content on the occurrence of an event in the interactive game world (e.g., clearing a stage, running low on health, interactions between characters and helpful objects, interactions between characters and enemies, receiving an enemy response to a character action, and the like).

Graphics libraries 402 may include graphics content (e.g., images, textures, projections, screen scrolling instructions, display instructions, and the like) and graphics processing instructions (e.g., object assembly instructions, game dimensions, display configurations, rendering instructions, shader performance optimizations, and the like) for generating characters, enemies, objects, landscapes, and other visual elements, included in the a interactive game universe. Graphics generated according to instructions included in the graphics libraries may be animated based on instructions included in the animations libraries 404. In various embodiments, animations for each visual object included in the interactive game world are included in the animations libraries 404. Animations content may include animation assets, animation trees, projections, and other information suitable for animating visual aspects included in a game universe. Animations for characters, dynamic objects within a game universe including enemies, harmful objects, helpful objects, puzzle space objects, landscape objects, and other visual objects included in an interactive game world may be included in the animations libraries 404. Instructions for integrating animations into the interactive game world may also be included in the animations libraries. For example, one or more triggers conditioning the performance of an animation on the occurrence of a particular event in the interactive game world. In various embodiments, the one or more triggers may include an interaction between a character and an enemy or other object in the puzzle space, a particular input control 441 received from a player, a game event (e.g., clearing a stage, or entering into a different phase within a stage, failing a stage, and the like), initialization of a player warning state (e.g., low health, an almost full puzzle space, and the like), initialization of a player advantage state (e.g., receiving a bonus, activating a power, and the like), and the like. Animations may be specific to a character, enemy, helpful object, harmful object, stage, phase of a state, level of difficultly, type of puzzle space, type of block arrangement included in a puzzle space, and the like.

The environment libraries 406 include background art, maps, scene landscape art, for example, tiles, objects, walls, rooms, and other scene components, scene rendering logic, scene projections, scene assembling instructions, and other landscape content for constructing one or more puzzle spaces included in one or more stages of a game universe. Landscape content included in environment libraries 406 may also be incorporated into UI elements surrounding the puzzle space within an interactive game world.

One or more logical components included in a video game application 326 may include instructions for selecting, filtering, sorting, combining, transforming, processing, and otherwise manipulating information provided by the one or more libraries 401, 402, 404, and 406 for producing a game universe. In this example, the character movement logic 403 creates character movements from instructions, art assets, and projections provided by the graphics libraries 402 and animations libraries 404. Character movements created by the character movement logic 403 may include player movements moving characters within a dynamic puzzle space to change the position of the character relative to one or more enemies and/or other objects included in the dynamic puzzle space and/or battle movements engaging a character in combat with one or more enemies. Animations for player movements may be different for each direction associated with a player movement. Animations for battle movements may be different for each character and/or each enemy type engaged by the character. Animations for battle movements may be specific to each unique character, enemy combination. Character movement logic 403 may also generate movements for dynamic objects within the game universe. For example, falling animations for enemies and/or other objects entering the dynamic puzzle space as an enemy response to a player movements and/or battle movement may be created according to character movement logic 403. Destruction animations and/or removal animations for groups of adjacent enemies and/or other objects may also be provided by character movements logic. For example, fire, explosions, light flashes, dust clouds, gas puffs, crumbling, dissolving, fading out, breaking down, cracking, assembling into rubble and generating coins, increasing experience, and the like may be programmed to occur when one or more enemies is defeated and/or other objects are removed from the dynamic puzzle space. By interfacing with the audio libraries 401 and environment libraries 406, the character movement logic 403 may layer on sound effects to particular character movements and interactions with scene objects and components. For example, battle movements have a sound effect and characters may emit a sound effect when they are otherwise damaged and/or enhanced by another object. Timing constraints and other validity tests may also be associated with certain character movements and/or movements of dynamic objects by the character movement logic 403. For example, falling movements of enemies and other objects into the dynamic puzzle space, player movements, battle movements, and other movements provided by character movement logic may be programed to take a particular amount of time complete. For example, it may take one type of enemy 3 seconds to fall from the space above the dynamic puzzle space to the bottom of the block pattern of the dynamic puzzle space. The completion time specified by the timing constraints and/or validity tests may change according to the character, enemy type, or object performing the movement subject to the timing constraint and/or validity test as well as events that occur within the interactive game world, the particular stage within the interactive game world the player is playing, the game difficulty level, player previous performance, predicted player performance, and the like. Character movement logic 403 may also define character, enemy, and/or object interactions with components included in the dynamic puzzle space, for example, landscape elements (e.g., ropes, ladders, vertical surfaces, and the like) that may be incorporated into the dynamic puzzle space of one or more stages.

Storyline logic 405 may integrate storyline elements such as storyline text, stage sequencing, sequencing of phases within a stage, transitions between phases, and transitions between stages, to link phases and/or stages together into a cohesive a game universe having a cognizable progression of phases within a stage and stages within a game universe. Storyline logic 405 may also specify the order of the stages and/or phases created by the game constructor 400. In various embodiments, storyline logic 405 may ensure all of the phases and stages associated with a particular enemy type are displayed consecutively to convey the story of defecting an enemy to a user. Storyline logic 405 may also specify the difficulty to the phases and/or stages created by the game constructor to, for example, ensure that as more stages are cleared and/or more enemies are defeated clearing stages becomes harder. Storyline logic 405 may include program instructions for presenting one or more storyline text files 412 received from the data manager 410 at the beginning, during, or ending of a stage. Storyline logic 405 may also interface with the character movement logic 403 to present storyline text when a character reaches a certain location within they progression of phases and/or stages associated with an enemy for example, a battle with a enemy at the final phase and/or stage linked to an enemy type. Storyline logic 405 may also present storyline text when a character reaches a particular location within a dynamic puzzle space (e.g., a space adjacent to a particular enemy type). Some characters and/or enemy types may also be associated with storyline text and other plot elements from the storyline logic 405. These elements may be presented according to instructions included in the storyline logic 405 immediately after a triggering event or action within a stage and/or phase, for example, when a character/enemy is first introduced, when the character/enemy reaches a certain position in a scene, performs a specific movement, or completes a task. By interfacing with one or more graphics libraries 402 or environment libraries 406, the storyline logic 405 may also sequence the order of phases and/or stages within a game universe and provide transitions from one phase and/or stage to another. The storyline logic 405 may also interface with the audio libraries 401 to play a recording of the storyline text as the text is presented within a scene.

In various embodiments, the game constructor may include puzzle assembly logic 406 for assembling a puzzle within the puzzle space. The puzzle may include a block pattern including instances of one or more enemy types, harmful objects, helpful objects, and/or landscape elements arranged in a block pattern. In various embodiments, multiple instances of the one or more enemy types, harmful objects, helpful objects, and/or landscape elements may be included in the block pattern puzzle so that multiple instances of the same enemy type, harmful object, helpful object, may be included in the same block pattern puzzle. In various embodiments, instances of the same one or more enemy types, harmful objects, helpful objects, and/or landscape elements may be adjacent within the puzzle space. Each instance of the one or more enemy types, harmful objects, helpful objects, and/or landscape elements may take up one space in a grid included in the dynamic puzzle space. Alternatively, instances of the one or more enemy types, harmful objects, helpful objects, and/or landscape elements may take up two or more spaces in the grid included in the dynamic puzzle space. In response to one or more player movements and/or battle movements additional instances of the one or more enemy types, harmful objects, helpful objects, and/or landscape elements by be added to the puzzle by falling into the dynamic puzzle space. The instances of the one or more enemy types, harmful objects, helpful objects, and/or landscape elements selected to fall into the dynamic puzzle space and the location within the puzzle where the additional instances of the one or more enemy types, harmful objects, helpful objects, and/or landscape elements will be incorporated may be determined according to puzzle assembly logic 406.

The data manager 410 interfaces with the game constructor 400 and object management system 420 to control the flow of data to each of the video game application 326 components. Media content for example, streaming video containing game scenes, game replays or plot elements, audio recordings, screenshots, custom or purchased characters, and other graphic content that is custom, paid, updated, or incorporated from another game is stored in a digital content library 314 and provided to the game constructor 400 and object management system 420 for integration into a simulation instance of an interactive game world according to instructions contained in the content management system 414. Player control files 413 including saved game data, player control configurations, and other player specific data received via one or more control inputs 441 is also provided to the video game application 326 and object management system 420 according to program instructions included in the content management system 414. Player control files 413 provided by the data manger 410 may be used to restore saved games and previously saved controller configurations in the simulated instance of the interactive game world provided by the simulation engine 430.

In various embodiments, data included in the video game application 326 will be the same for every player of the video game and an identical copy of the video game application 326 will be loaded onto every instance of a particular gaming device that renders the game. Additionally, data included in the video game application 326 will not change when the game is played. Instead, the video game application 326 retains its original state until the game application code is patched, updated, or otherwise modified. This configuration allows a similar gameplay experience for all players and ensures consistent gameplay each time a player interacts with the interactive game world specified by the video game application 326. To enable users to interact with the interactive game world created by the video game application 326 and play the game, the simulation engine 430 renders a simulated instance of the interactive game world including the video game gameplay described herein in a user interface 440. Players control characters within the simulated instanced of the interactive game world by entering one or more control inputs 441 through the player interface 440. The control inputs 441 are received by the object management system 420. In response to receiving control inputs 441 the object management system 420 may generates updated object state information update the simulated instance of the interactive game world according to the updated object states. In this way, players are provided a unique, interactive game world simulation that they can manipulate that is consistent across every device platform executing an instance of the video game application 326.

The simulation engine 430 renders a stimulated instance of an interactive game world assembled by a game constructor 400. As control inputs 441 are received from a player the simulated instance of the interactive game world is updated. As stages and/or phases within a stage included in the interactive game world are impacted by control inputs 441, the game constructor 400 modifies the phase and/or stage according to the received control inputs 441. For example, puzzle assembly logic 406 by add one or more new instances of one or more enemy types, harmful objects, helpful objects, and/or landscape elements to a stage and/phase as an enemy response to a player movement and/or battle movement. As stages and/or phases are cleared the game constructor 400 may assemble the next phase and/or stage according to the sequence provided by storyline logic 405. The simulation control module 431 controls the function of the simulation engine 430 generally and processes object state information updates received from the object management system 420. The simulation control module 431 interfaces with the interactive game world 436 to change the position of characters and objects in the game world in accordance with control inputs 441 received from a player interface 440. Player artificial intelligence (AI) 432 and bot AI 433 influence character and object movements within the interactive game world 436. Player AI 432 provides for automated movements of player controllable characters, for example, connecting movements between animations, and pre-programmed interactions with enemies and other objects including helpful objects, harmful objects, and/or landscape elements (e.g., ladders, moving platforms, slides, launch objects). Player AI 432 may also include one or more validity tests, program instructions, or game logic for limiting the performance of specific character moments depending on the gameplay context. For example, characters can only perform an enemy specific battle movement when interacting with the right type of enemy or move to the right within the dynamic puzzle space when one or more grid spaces to the right of the character's current position area available. Bot AI 433 provides for automated movements of creatures, bosses, enemies, dynamic objects, static objects, helpful objects, harmful objects, and other dynamic components of the phases and/or stages of the interactive game world. Movements provided by the bot AI 433 may be programmed to change according to game skill level, for example, easy, medium, hard, or impossible or player selected game universe configurations. Physics libraries 435 contain application code for simulating one or more physical systems, for example, rigid body dynamics, collision detection, soft body dynamics, and fluid dynamics. In this example, the physics libraries 435 control rendering of character movements, object movements, landscape aspects, character interactions with objects, character interactions with scene landscape aspects, and object interactions with scene landscape aspects within the interactive game world 436 to provide realistic simulations.

Game AI 434 includes game rules that create the gameplay experience provided by the video game application 326. The game AI 434 governs game play elements, for example, how characters move through stages, interact with game objects, achieve stage objectives, fail stage objects, score points, gain experience, defeat enemies, damage objects, and progress through the game, to provide a consist gameplay experience for all players playing at the same selected skill level.

In various embodiments, the video game application 326 is executed by a processor of a gaming device to generate an interactive game world including a plurality of unique stages linked to together to form a cohesive storyline that may describe a series of battles with one or more enemies. Each stage may include one or more phases with the stage and a player must complete all of the phases of a stage to clear the stage. The interactive game world may be rendered in a user interface displayed on a gaming device by a simulation engine according to stage assembly instructions provided by the game constructor 400. One or more operations may be performed by a game constructor to assemble each stage included in the interactive game world. Stages created by the game constructor 400 may include one or more characters within a dynamic puzzle space including an arrangement of virtual objects (e.g., one or more enemies, harmful objects, harmful objects, and the like). The objects may be arranged by puzzle assembly logic 406 as a puzzle having a block pattern. The objects included in the puzzle and the arrangement of the objects may change for each phase and/or stage included in the interactive game world.

To clear a stage and/or phase, the character battle enemies included in the puzzle. Each time a character defeats an enemy, the character may earn a player reward (e.g., experience points, coins, and the like). To earn more reward, a character may be positioned within the dynamic puzzle space to battle enemies adjacent to other instances of enemies of the same enemy type. By defeating an enemy adjacent to other instances of the same enemy type, a character can eliminate all the other instances of the same enemy type bordering an instance of that enemy type on at least one side. For example, by defeating a first skull enemy included in a horizontal line formation of three skull enemies touching on at least on side of the enemy object, the character may defeat all three enemies simultaneously and earn reward equivalent to and/or greater than the reward for defeating three skull enemies individually. Once a character has accumulated enough player rewards, an opportunity to clear the stage may be presented to the character (e.g., fall into the dynamic puzzle space). The opportunity may include a door that a character can unlock using a helpful object (e.g., a key) incorporated into the block pattern puzzle of the dynamic puzzle space. By unlocking the door with the key, the character may clear the stage/phase and advance to the next stage/phase included in the plurality of stages/phases in the interactive game world. The game AI 434 may execute a plurality of computations to determine the arrangement of virtual objects based on a selected level of difficulty (e.g., easy, medium, hard, and the like), number of stages passed, virtual objects associated with a stage, characteristics of a character, number of stages remaining in the game, previous player performance, and/or expected player performance. The sequence of stages created by the game AI 434 may correspond to one or more storylines programmed into the game AI. The storylines may be particular to a character, player, difficulty level, desired length of game, and the like. Storylines for generating stages may also be customized by the user according to control inputs received in the user interface. Instructions for creating interactive game worlds provided by the game AI may be specific to a particular stage.

Figure 5:
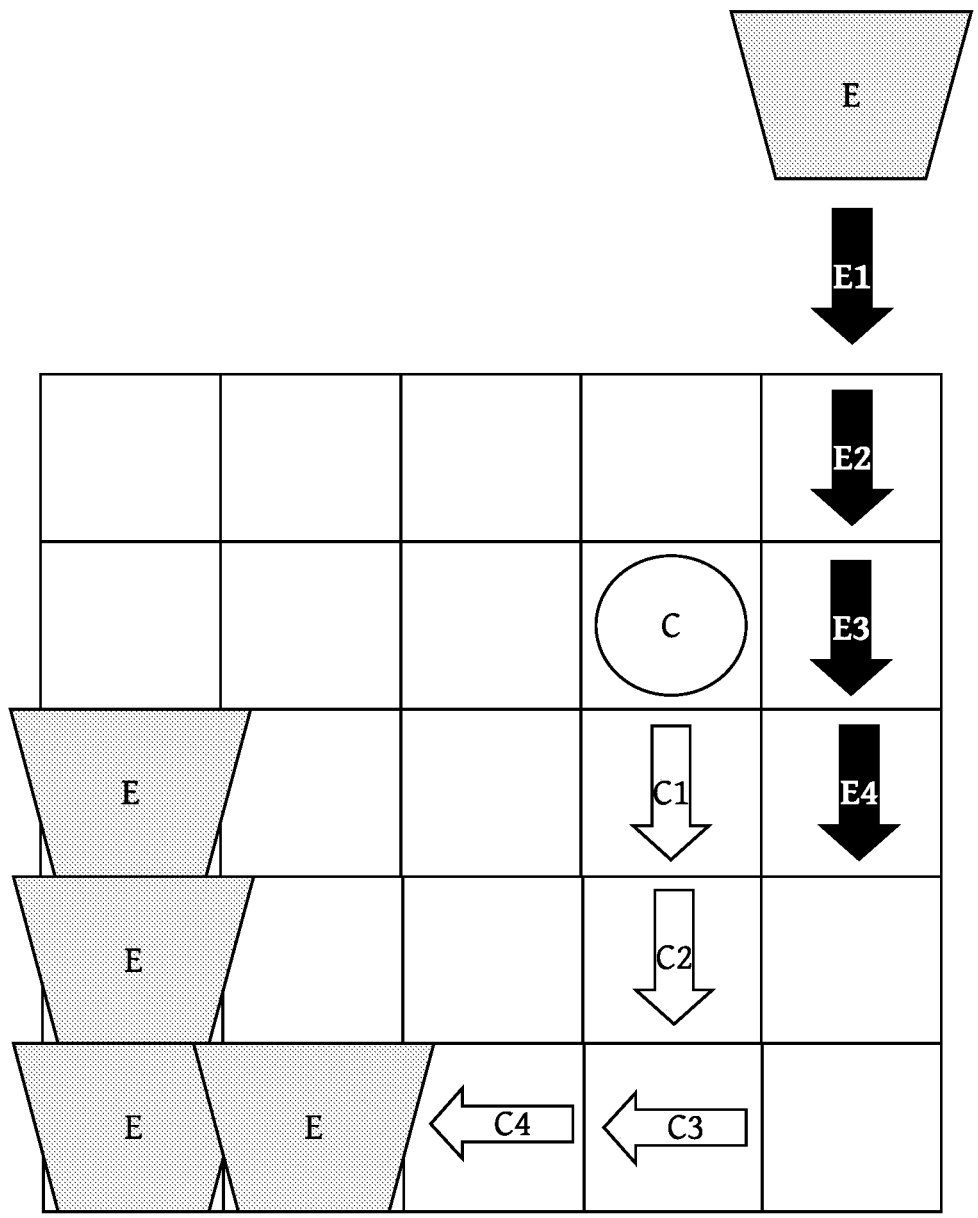
FIG. 5 displays exemplary character movement game mechanics of the game world illustrated in FIGS. 1-2.
Figure 6:
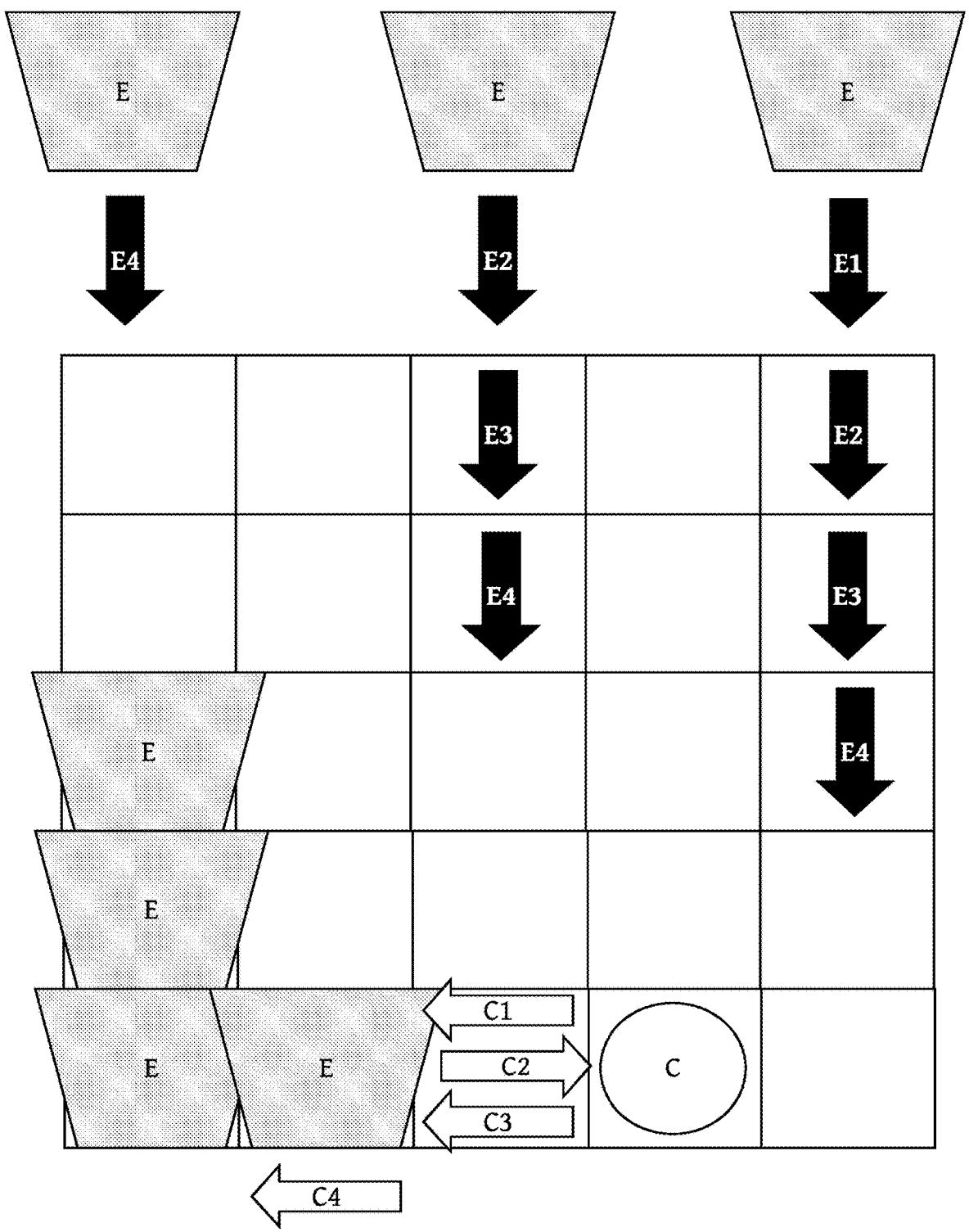
FIG. 6 illustrates exemplary character battle game mechanics of the game world illustrated in FIGS. 1-2

In various embodiments, to create a unique game play experience, the game AI 434 may, in response to receiving a player movement and/or a battle movement from a player, generate an enemy response (e.g., a new enemy falling into the dynamic puzzle space). In various embodiments, the game AI 434 may sync the enemy response to the player movement so that the game AI 434 generates an enemy response automatically every time the player moves the character and/or battles an enemy. By syncing the enemy response to the actions (e.g., player movements and battle movements) of the player, the game AI conditions the gameplay experience on the actions performed by the player. The more actions performed by the player the more enemy responses created by the game AI 434. By conditioning the gameplay experience on the actions of the player, the game AI 434, creates a flexible, non-determinative gameplay that is unique to every player and creates and new game situation every time a player moves a character or battles and enemy. Syncing an enemy response with each player action (e.g., player movement and battle movements) so that the enemy response mirrors the player action creates every changing game play situation in which every move is important thereby creating a more entertaining gameplay. In various embodiments, the enemy responses generated by the game AI 434 in response to player movements may be different than the enemy response generated by the game AI 434 in response to battle movements. FIGS. 5 and 6 below describe the mechanics of the game play generated by the game AI 434.

FIG. 5 illustrates an example dynamic puzzle space 500 having a plurality of grid spaces 502. The dynamic puzzle space may include an arrangement of enemy instances 504 and a character 506. The enemy instances may be arranged in as a puzzle, for example, a block pattern puzzle. In various embodiments, the game AI may sync the player movement moving the character 506 within the dynamic puzzle space with an enemy response. In various embodiments, the game AI may sync the player movement with the enemy response using a turn mechanism that causes the enemy response to proceed toward being integrated into the puzzle at the same rate as the player causes the character moves through the puzzle space by inputting character movement controls into a controller. As shown in FIG. 5, the turn mechanism couples the player movement to the enemy response to generate an enemy response that is equivalent to the character movement. For example, the character path shown in FIG. 5 includes 4 character movements (C1-C4). For example, character movement the enemy instance 504 moves one grid space in a falling movement (E1-E4). The enemy instances falling movement may be completed when the enemy instances reach a bottom gird space of the dynamic puzzle space 502 and or reaches a gird space that already has an enemy instance 504 inside. By stacking enemy instances higher and higher to fill more of the grid space the enemy fights back against the character. If the character is not able to remove enemies fast enough, the grid space will fill up and the eventually once all the space is full and/or one or more columns exceed the maximum height of the dynamic puzzle space the character will fail the phase/stage.

In various embodiments, the game AI may condition the severity of the enemy response by modifying pace of the falling motion, the number of enemy instances generated by each character movement, the placement of the enemy instances. In various embodiments, the severity of the enemy response may be increased as more stages are cleared and or the difficulty level is raised. The game AI may also vary the enemy response based on the type of action performed by the player. For example, as shown in FIG. 6, during a combat sequence in which a character 506 performs battle movements to defeat an enemy 504, the enemy response provided by the game AI that is synced the battle movements may be more severe than the enemy response synced to the player movements. For example, each time a character performs a battle movement to engage in combat with an enemy instance, the game AI may create a new enemy instance that falls into and through the dynamic puzzle space at the same rate as the character battles with an enemy and or creates moves throughout the dynamic puzzle space. As shown in FIG. 6, in four turns (turns are defined as player action, enemy response pairs), the character 506 performed three battle movements (C1-C3) and one player movement (C4). Each of the three battle movements was synced with a more severe enemy response relative to the player movement so that every time a battle movement was received, the game AI generated an additional enemy instance and moved every generated enemy instance one space toward the bottom of the dynamic grid space. The enemy response synced with the player movement was less severe so in response to receiving the player movement, the game AI progressed each generated instance toward the bottom of the dynamic grid space but did not create additional enemy instances.

In various embodiments, the interactive game world provided by the video game application may include multiple playable characters. Each playable character may have different properties includes strengths, weaknesses, special attacks, special abilities, and the like. For example, one character may spawn more helpful objects (e.g., portions that provide extra life) and a second a character may have a special combat ability that allows it to do more damage when interacting with an enemy with a battle movement from a specific direction, for example, above, below, left, right, diagonal, and the like. One or more special combat abilities of a character may be activated by entering one or more input controls on a controller. In various embodiments, the enemy 504 may be selected from a variety of different enemy types. Each enemy type may have a unique appearance and one or more unique abilities. Some enemy types may take up more than one grid space, some enemy types may inflict more damage on a character during a combat sequence when the character interact with the enemy using a battle movement. One or more different types of enemies may be included in a block pattern puzzle. Groups of two or more adjacent enemies and/or enemies connected on at least on side may have special properties including causing extra damages, requiring more battle movements to defeat, having a unique appearance, having a higher attack power, producing a more severe enemy response, and the like.

Figure 7:
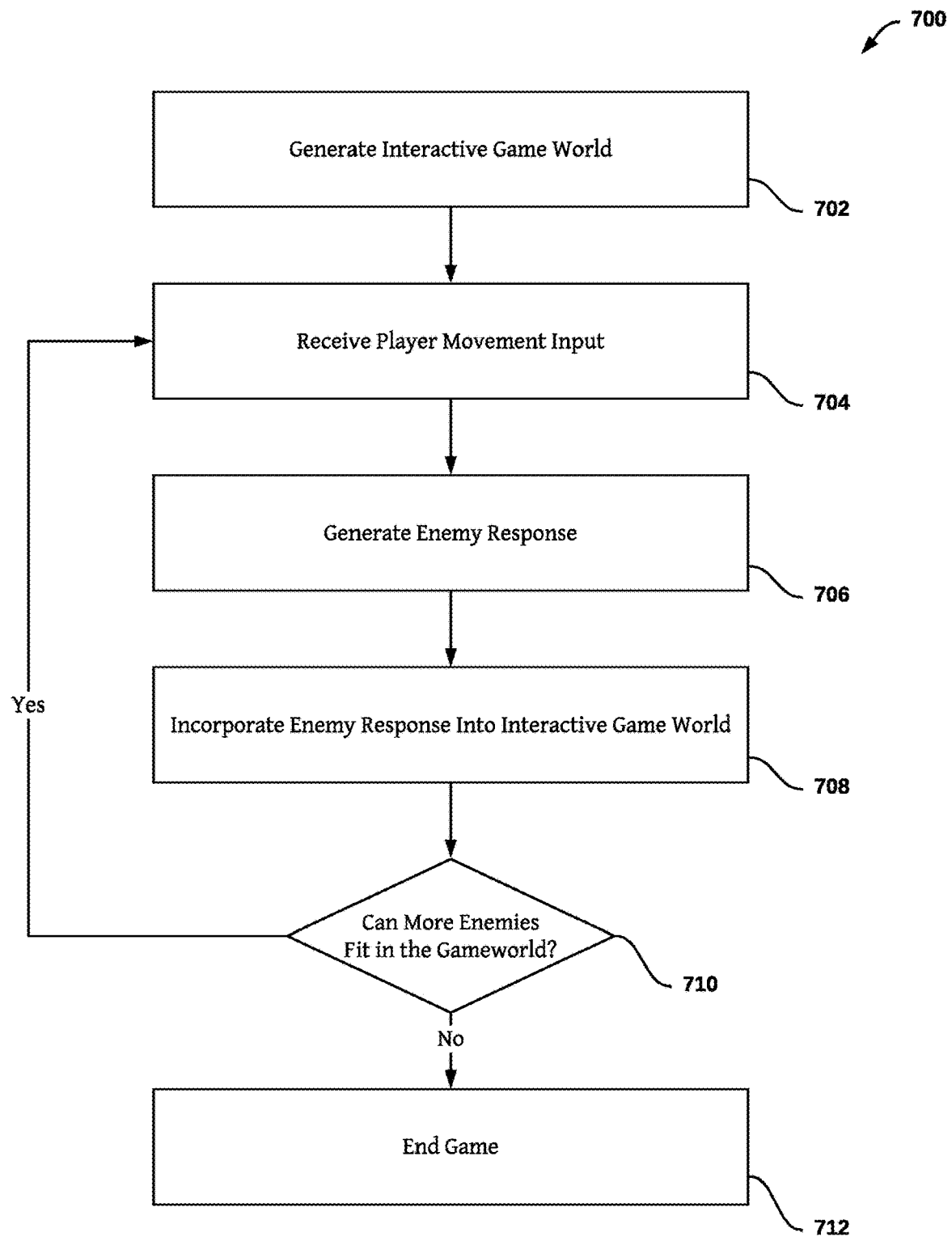
FIG. 7 is a block diagram illustrating an exemplary computer implemented method of providing a player movement gameplay of FIGS. 1-2.

FIG. 7 illustrates a block diagram of a computer implemented method for producing a turn based interactive video game gameplay. At step 702, one or more processors execute instructions included in a video game application to generate an interactive game world comprising a plurality of stages, each stage in the plurality of stages may include a dynamic puzzle space having a character and one or more enemies. In various embodiments, the interactive game world is generated according to instructions provided by a game AI included in the video game application. At step 704, the simulation engine receives, from a video game device controller, a player movement changing a position of the character within the interactive game world. The player movement may be registered by the game as equivalent to one player turn depending on how many grid spaces the character moves as a result of the player movement. The game AI may track each movement the character makes within the dynamic puzzle space to record how many player movements and or turns a character makes. The game AI may apply a conversion factor to convert the number of player movements into turns, detected by tracking of the game AI, into player turns. To make the game less difficult, the game AI may apply a conversion factor of less than 1 when converting the number of player movements to player turns so that each player movement received from the controller results in less than one player turn. To make the game more difficult, the game AI may apply a conversion factor of greater than 1 when converting the number of player movements to player turns so that each player movement received from the controller results in more than one player turn.

At step 706, in response to receiving the player movement from a controller, the game AI may generating an enemy response to the player movements, the enemy response may include generating an instance of the one or more enemies and or moving the one or more generated enemies into the dynamic puzzle space by executing a falling movement that causes the one or more generated enemies to fall into the dynamic puzzle space in a straight, diagonal, curved or irregular falling pattern. In various embodiments, generating one enemy instance and or moving the enemy instance into and/or through the dynamic puzzle space one grid space may be equivalent to one enemy turn. After generating the enemy response, the game AI may syncing the enemy turn with the player turn so that a falling movement of the instance of the one or more enemies mirrors the player movement. The game AI may apply a scaling factor when syncing the enemy turn to the player turn so that the enemy turn may impact the game faster and or slower than the player turn. To make the game less difficult, the game AI may apply a scaling factor of less than 1 when converting the number of player turns to enemy turns so that each player turn results in less than one enemy turn. To make the game more difficult, the game AI may apply a scaling factor of greater than 1 when converting the number of player turns to enemy turns so that each player movement received from the controller results in more than one player turn. At step 708, the game AI may then incorporate the instance of the one or more enemies into the puzzle space by stacking the instance of the one or more enemies vertically on top of other instances of the one or more enemies previously added to the puzzle space. At decision point 710, the number of enemies in the dynamic puzzle space of the interactive game world is evaluated. If the number of enemies in the dynamic puzzle space exceeds the capacity of the interactive game world then the player fails the stage and the game ends at step 712. If the number of enemies does not exceed the capacity of the dynamic puzzle space, then the game AI continues to continuously track the play movements received by the controller and repeats steps 704-710 in response to detecting a player movement. In various embodiments, the enemy response may still be triggered by a time based trigger in the event the character does not perform a movement within a time period defined as a condition of the time based trigger.

Figure 8:
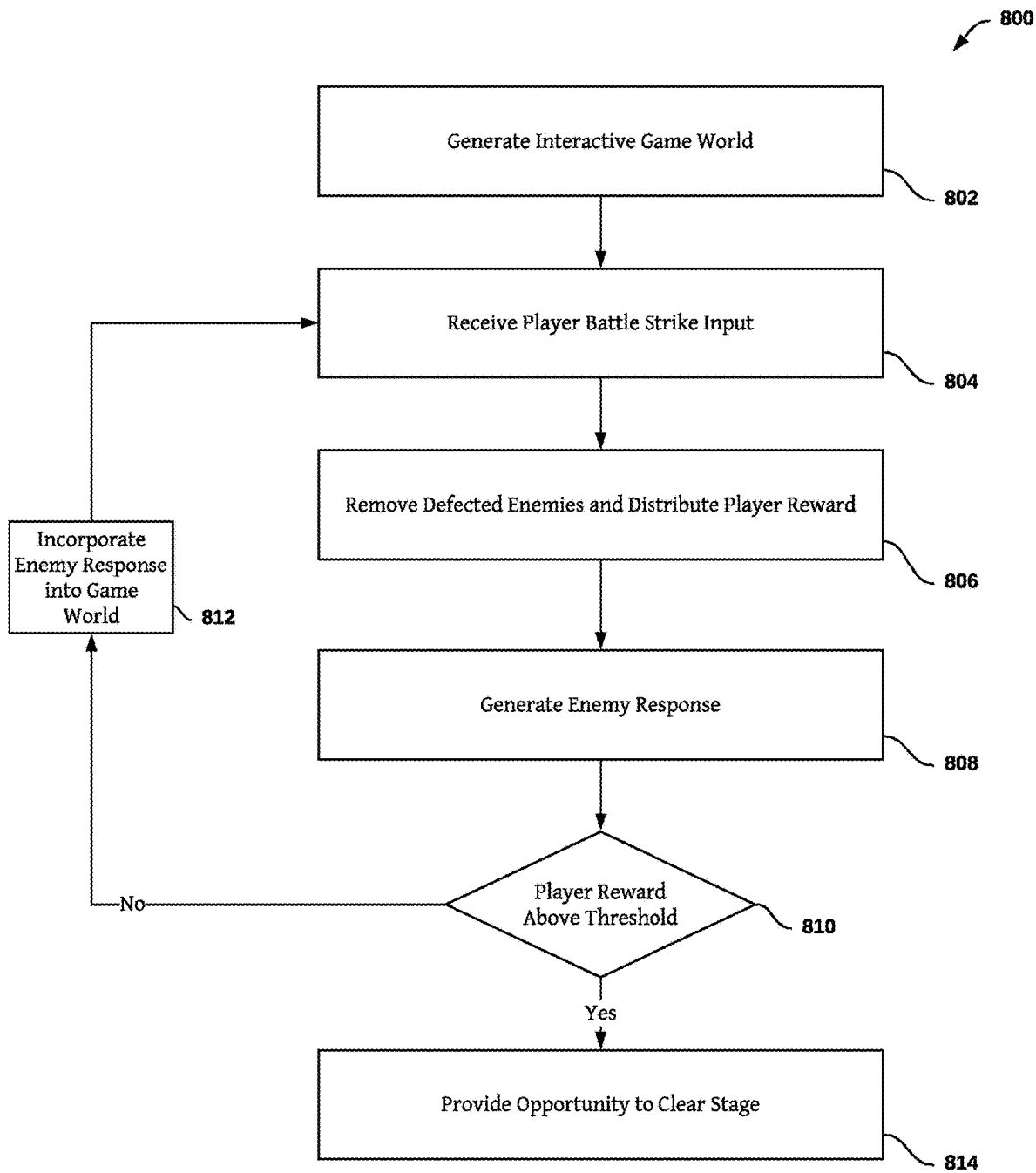
FIG. 8 is a block diagram illustrating an exemplary computer implemented method of providing a battle gameplay of FIGS. 1-2.

FIG. 8 illustrates a computer implemented method for producing a turn based interactive video game gameplay. At step 802 one or more processors executing a video game application may generate, according to instructions provided by a game AI, an interactive game world comprising a plurality of stages, each stage in the plurality of stages, including a dynamic puzzle space having a character and one or more enemies. At step 804, the game AI continuously tracks the character movement in a dynamic puzzle space and monitors input controls received from a controller to detect a player battle movement engaging the character in combat with the one or more enemies. Once a character has performed enough battle movements to defeat an instance of an enemy, the defeated enemy instances may be removed from the dynamic puzzle space and a reward may be distributed to the character, at step 806. To earn more rewards a player may defeat enemies included in chains of enemies of the same enemy type connected by one or more sides. Defeating enemies included in chains may result in a combo bonus that rewards multiplies the reward earned for enemies defeated by a bonus value. The bonus value may be scaled to the number of enemies in chain. At step 808, in response to receiving the battle movement, the game AI generates a second enemy response impacting the dynamic puzzle space and incorporating the second enemy response into the dynamic puzzle space. At decision point 810, if a player reward is above a reward threshold, an opportunity to clear the stage is presented to the player in step 814. If the player reward is below the reward threshold, the enemy response is incorporated into the dynamic puzzle space of the interactive game world, at step 812 and steps 804-810 are repeated. In various embodiments, the game AI may reward extra player rewards of defeating enemies quicker and/or clearing stage quickly.

The invention claimed is:

1. A computer implemented method for providing a turn based video game gameplay comprising:
    receiving an input that controls a movement of a character within a dynamic puzzle space that includes one or more objects, the input equivalent to a player turn;
    generating a game response to the input, the game response causing a game object to fall into the dynamic puzzle space, the game response equivalent to an enemy turn;
    syncing the enemy turn with the player turn so that a falling movement of the game object mirrors the movement of the character;
    adding the game object to a stack of the one or more objects included in the dynamic puzzle space;
    ending a turn based video game gameplay when the stack of the one or more objects exceeds a stack height threshold; and
    converting the input into the player turn based on a conversion factor.

2. The method of claim 1, further comprising:
    receiving an attack action that engages the character with at least one of the one or more objects;
    removing, from the dynamic puzzle space, the at least one of the one or more objects engaged by the character during the attack action; and
    distributing a reward to the character.

3. The method of claim 2, further comprising calculating a total aggregate reward each time the reward is distributed to the character;
    comparing the total aggregate reward to a reward threshold; and
    introducing, into the dynamic puzzle space, a helpful object that provides an opportunity to clear a stage of the interactive game world based on determining the total aggregate reward is above the reward threshold.

4. A computer implemented method for providing a turn based video game gameplay comprising:
    receiving an input that controls a movement of a character within a dynamic puzzle space that includes one or more objects, the input equivalent to a player turn;
    generating a game response to the input, the game response causing a game object to fall into the dynamic puzzle space, the game response equivalent to an enemy turn;
    syncing the enemy turn with the player turn so that a falling movement of the game object mirrors the movement of the character;
    adding the game object to a stack of the one or more objects included in the dynamic puzzle space;
    ending a turn based video game gameplay when the stack of the one or more objects exceeds a stack height threshold; and
    syncing the enemy turn with the player turn based on a scaling factor.

5. The method of claim 4, further comprising:
    receiving an attack action that engages the character with at least one of the one or more objects;
    removing, from the dynamic puzzle space, the at least one of the one or more objects engaged by the character during the attack action; and
    distributing a reward to the character.

6. The method of claim 5, further comprising
    calculating a total aggregate reward each time the reward is distributed to the character;
    comparing the total aggregate reward to a reward threshold; and
    introducing, into the dynamic puzzle space, a helpful object that provides an opportunity to clear a stage of the interactive game world based on determining the total aggregate reward is above the reward threshold.

7. A computer implemented method for providing a turn based video game gameplay comprising:
    providing an interactive game world including a co-op mode that allows multiple players to collaborate, the interactive game world including a dynamic puzzle space having multiple characters and one or more objects;
    receiving an input that controls a movement of at least one of the multiple characters within the dynamic puzzle space;
    storing the input as a player turn;
    generating a game response to the input, the game response causing a game object to fall into the dynamic puzzle space;
    storing the game response as an enemy turn; and
    syncing the enemy turn with the player turn so that a falling movement of the game object mirrors the movement of the at least one of the multiple characters;
    converting the input for the at least one of the multiple characters into the player turn based on a conversion factor;
    making the co-op mode less difficult for at least one of the multiple players by using a value for the conversion factor that is less than one so that each input received from the least one of the multiple players results in less than one player turn; and
    making the co-op mode more difficult for at least one of the multiple players by using a value for the conversion factor that is more than one so that each input received from the at least one of the multiple players results in more than one player turn.

8. The method of claim 7, wherein each of the multiple characters is controlled by a different player of the turn based video game gameplay.

9. The method of claim 7, wherein the multiple characters in the co-op mode collaborate to clear the dynamic puzzle space by removing the one or more objects from the dynamic puzzle space.

10. The method of claim 7, further comprising:
    receiving an attack action that engages at least one of the multiple characters with at least one of the one or more objects;
    removing, from the dynamic puzzle space, the one or more objects engaged by the at least one of the multiple characters during the attack action; and
    distributing a reward to the at least one of the multiple characters.

11. The method of claim 7, wherein the mirroring of the falling movement of the game object with the movement of the at least one character comprises:

moving the at least one character a distance within the dynamic puzzle space based on the movement; and moving the game object an equivalent distance within the dynamic puzzle space in response to the movement.

12. A computer implemented method for providing a turn based video game gameplay comprising:

providing an interactive game world including a co-op mode that allows multiple players to collaborate, the interactive game world including a dynamic puzzle space having multiple characters and one or more objects;

receiving an input that controls a movement of at least one of the multiple characters within the dynamic puzzle space;

storing the input as a player turn;

generating a game response to the input, the game response causing a game object to fall into the dynamic puzzle space;

storing the game response as an enemy turn; and syncing the enemy turn with the player turn so that a falling movement of the game object mirrors the movement of the at least one of the multiple characters;

incorporating the game object into a stack of the one or more objects included in the dynamic puzzle space; and ending a turn based video game gameplay when the stack of the one or more objects exceeds a stack height threshold.

13. A computer implemented method for providing a turn based video game gameplay including a head to head mode, the method comprising:

providing an interactive game world including a head to head mode that allows multiple players to compete against each other, the interactive game world comprising multiple dynamic puzzle spaces with one of the multiple dynamic puzzle spaces for each of the multiple players, each dynamic puzzle space including a character and one or more objects;

receiving an input that controls a movement of the character within a particular dynamic puzzle space;

storing the input as a player turn;

generating a game response to the input, the game response causing a game object to fall into the particular dynamic puzzle space;

storing the game response as an enemy turn;

syncing the enemy turn with the player turn so that a falling movement of the game object mirrors the movement of the character;

incorporating the game object into a stack of the one or more objects included in the particular dynamic puzzle space; and ending a turn based video game gameplay when the stack of the one or more objects exceeds a stack height threshold.

14. The method of claim 13, further comprising displaying each of the multiple dynamic puzzle spaces side by side on a screen so that each of the multiple players is able to see the multiple dynamic puzzle spaces on the screen.

15. The method of claim 13, wherein each of the multiple dynamic puzzle spaces includes a character controlled by a different player included in the multiple players.

16. The method of claim 13, further comprising:

receiving an attack action that engages the character with a helpful object that provides an opportunity to clear a particular dynamic puzzle space; and determining a winner of a stage of the head to head mode based on a player who controls the character that clears the particular dynamic puzzle space first.

17. A computer implemented method for providing a turn based video game gameplay comprising:

providing an interactive game world including a co-op mode that allows multiple players to collaborate, the interactive game world including a dynamic puzzle space having multiple characters and one or more objects;

receiving an input that controls a movement of at least one of the multiple characters within the dynamic puzzle space;

storing the input as a player turn;

generating a game response to the input, the game response causing a game object to fall into the dynamic puzzle space;

storing the game response as an enemy turn;

syncing the enemy turn with the player turn so that a falling movement of the game object mirrors the movement of the at least one of the multiple characters;

syncing the enemy turn with the player turn based on a scaling factor;

making the co-op gameplay mode less difficult for at least one of the multiple players by using a value for the scaling factor that is less than one so that each player turn for the at least one of the multiple players results in less than one enemy turn; and making the co-op gameplay mode more difficult for at least one of the multiple players by using a value for the scaling factor that is more than one so that each player turn for the at least one of the multiple players results in more than one enemy turn.

18. The method of claim 17, wherein each of the multiple characters is controlled by a different player of the turn based video game gameplay.

19. The method of claim 17, wherein the multiple characters in the co-op mode collaborate to clear the dynamic puzzle space by removing the one or more objects from the dynamic puzzle space.

20. The method of claim 17, further comprising:

receiving an attack action that engages at least one of the multiple characters with at least one of the one or more objects;

removing, from the dynamic puzzle space, the one or more objects engaged by the at least one of the multiple characters during the attack action; and distributing a reward to the at least one of the multiple characters.

21. The method of claim 17, wherein the mirroring of the falling movement of the game object with the movement of the at least one character comprises:

moving the at least one character a distance within the dynamic puzzle space based on the movement; and moving the game object an equivalent distance within the dynamic puzzle space in response to the movement.

* * * * *